(12) United States Patent
Arngren et al.

(10) Patent No.: US 11,558,652 B2
(45) Date of Patent: Jan. 17, 2023

(54) METHOD AND SYSTEM FOR MEDIA CONTENT PRODUCTION

(71) Applicant: Telefonaktiebolaget LM Ericsson (publ), Stockholm (SE)

(72) Inventors: Tommy Arngren, Södra Sunderbyn (SE); Peter Ökvist, Luleå (SE); David Lindegren, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/972,678

(22) PCT Filed: Jun. 8, 2018

(86) PCT No.: PCT/EP2018/065152
§ 371 (c)(1),
(2) Date: Dec. 7, 2020

(87) PCT Pub. No.: WO2019/233595
PCT Pub. Date: Dec. 12, 2019

(65) Prior Publication Data
US 2021/0250636 A1    Aug. 12, 2021

(51) Int. Cl.
*H04N 21/414* (2011.01)
*G06F 16/74* (2019.01)
(Continued)

(52) U.S. Cl.
CPC ..... *H04N 21/41422* (2013.01); *B64C 39/024* (2013.01); *G06F 16/743* (2019.01);
(Continued)

(58) Field of Classification Search
CPC ....... H04N 21/41422; H04N 21/21805; H04N 21/2743; H04N 21/4223; H04N 21/4334;
(Continued)

(56) References Cited

U.S. PATENT DOCUMENTS

2014/0152834 A1   6/2014   Kosseifi et al.
2017/0140655 A1*  5/2017   Erickson .............. G08G 5/0039
(Continued)

FOREIGN PATENT DOCUMENTS

WO     2018014338 A1    1/2018

OTHER PUBLICATIONS

International Search Report and Written Opinion of the International Searching Authority for PCT International Application No. PCT/EP2018/065152 dated Feb. 12, 2019.
(Continued)

*Primary Examiner* — Yassin Alata
(74) *Attorney, Agent, or Firm* — Sage Patent Group (57) ABSTRACT

A method and a system configured to execute the mentioned method is suggested, where the method is capturing media content associated with at least one object, using a plurality of media capturing devices, each carried by a mobile communication device, together forming a mobile media device. The method comprise: controlling each of the mobile media devices according to a respective, predefined role and role specific rules for mobile media device movements, while capturing media content, following the movement of the at least one determined object; acquiring sensor data, indicative of the mobile media device movements, from the mobile media devices, and updating the roles of the mobile media devices, based on the acquired sensor data.

25 Claims, 7 Drawing Sheets

(51) Int. Cl.
  *B64C 39/02* (2006.01)
  *H04N 21/218* (2011.01)
  *H04N 21/2743* (2011.01)
  *H04N 21/4223* (2011.01)
  *H04N 21/433* (2011.01)
  *H04N 21/6543* (2011.01)

(52) U.S. Cl.
  CPC ... *H04N 21/21805* (2013.01); *H04N 21/2743* (2013.01); *H04N 21/4223* (2013.01); *H04N 21/4334* (2013.01); *H04N 21/6543* (2013.01); *B64C 2201/123* (2013.01)

(58) Field of Classification Search
  CPC . H04N 21/6543; G06F 16/743; B64C 39/024; B64C 2201/123
  See application file for complete search history.

(56) References Cited

U.S. PATENT DOCUMENTS

| | | |
|---|---|---|
| 2018/0102143 A1 | 4/2018 | Allison et al. |
| 2019/0107845 A1* | 4/2019 | Kaine ............... G05D 1/0022 |
| 2019/0174149 A1* | 6/2019 | Zhang ............. H04N 21/21805 |
| 2021/0243243 A1* | 8/2021 | Ljung ............... H04N 21/2662 |
| 2021/0319201 A1* | 10/2021 | Kale .................. G06K 9/0063 |

OTHER PUBLICATIONS

Messina et al., "MULTIDRONE—Multiple DRONE platform for media production," D2.1: Multidrone media production requirements, No. 731667, Jul. 1, 2017, 75 pages.

\* cited by examiner

| Mobile media Device ID | Media Type | Role | Role weight | Mobile Media Device | Area | Description |
|---|---|---|---|---|---|---|
| 0010 | Video | Frontview | x1 | UAV A | All | Capturing the object from the front |
| 0020 | Video | Side view fr. right | x2 | UAV A | All | Capturing the object from the right |
| 0030 | Video | Overview | x1 | UAV B | All expect finish | Capturing the object from the front |
| 0030 | Video | Overview | x3 | UAV B | finish | Capturing the object from the right |

Figure 4

| Mobile media device ID 0010 | |
|---|---|
| Zoom level X1-X2 | x |
| Motion blur Y1-Y2 | y |
| Dept of field Z1-Z2 | z |
| Image quality P1-P2 | p |

METHOD AND SYSTEM FOR MEDIA CONTENT PRODUCTION

CROSS REFERENCE TO RELATED APPLICATION

This application is a 35 U.S.C. § 371 national stage application of PCT International Application No. PCT/EP2018/065152 filed on Jun. 8, 2018, the disclosure and content of which is incorporated by reference herein in its entirety.

TECHNICAL FIELD

A method and an arrangement are suggested for enabling media content production in an environment where mobile devices, capable of capturing such content via camera, are also capable of moving in a controlled and coordinated way.

BACKGROUND

From having been limited to professional users, multi-camera production has evolved to a project form which can be executed by practically anyone. Even though numerous productions are still provided, where a plurality of cameras, each of which have limited mobility, are used, camera development now allows for more solutions which are based on cheaper, lighter and more easy-to-use devices capable of carrying and controlling cameras with extended mobility. Today there are a multitude of alternative solutions available on the market for anyone, from amateur users to professional users, aiming for a multi-camera production on a manual, semi-manual or fully automated basis.

Mobile equipment capable of capturing media, such as e.g. video, is getting more popular and the quality of videos produced with such equipment is also constantly improving. The use of video cameras in various situations, as well as the increasing distribution of such videos, also raises the demand for capturing different situations in daily life, as well as at specific events, such as e.g. sports, music and outdoor events, in a format, commonly recognized from more professional productions. Furthermore, also in professional video productions, there is a raising demand for more flexible solutions, which can provide further assistance to the video producer.

Unmanned Aerial Vehicles (UAVs), which may also be referred to as drones, constituting flying, ground-based controlled devices or vehicles, are used in a wide variety of applications throughout society, including delivery services, remote sensing tasks, rescue services, city planning and civil engineering. UAVs are also, to an increasing extent, used for aerial photography and film production, much due to reduced sizes of commercially available UAV carried cameras, improved and simplified UAV control systems, as well as a steadily improving level of quality when it comes to cameras, carried by UAVs. There are a number of UAVs available for video production that can be remotely controlled, using e.g. Wi-Fi, 3GPP access, or some proprietary radio communication. In addition to being remotely controllable, such UAVs are also commonly capable of operating autonomously, sensing data by sensors or by camera, or as a combination of both. UAVs may also be capable of analysing sensed data, before the data is provided to a central entity for processing.

Production corporations, broadcasting big sports events, such as e.g. NFL, MLB, pro golf, as well as various types of high speed sports events, including downhill skiing, bicycle and car races, are to an increasing extent using UAVs as part of their live sports broadcasts. More and more commonly, UAVs are thereby used for capturing both taped, and live, flyover footage of various events, which are considered to be of interest to a large audience.

Use of UAVs in video production allow broadcasts of events to provide not only close-up views but also bird-eye views, and anything in-between, in a mix which aims at providing a satisfying user experience. In addition, there are numerous UAV based solutions available for enhancing video capturing even further, such as e.g. follow-me functions or support, which simplifies video production, when a specific object of interest is being continuously and autonomously followed by one or more UAVs. By applying such a follow-me technology, a UAV, programmed therefore, will be able to automatically follow a user, thereby giving the viewer many opportunities to experience a wide variety of aerial shots. Most follow-me UAVs can also alternately go from remaining stationary, tracking an object by rotating its hull/camera, to moving along with the object, all depending on the behaviour of the object. Follow-me technologies may be based e.g. on following a GPS transmitter, carried by the object to be followed, or it may be based on image recognition of the object to follow.

However, when producing video, using a plurality of mobile devices, which may include UAVs, carrying cameras, complexity arises also for the video producer, especially during real-time distribution. It is therefore a desire to simplify the mentioned type of media production, which, in addition to video, also may include other types of media, such as e.g. still pictures and audio, while maintaining a high quality production to the end users.

SUMMARY

It is an object of the present document to address, or at least alleviate, at least some of the problems described above.

More specifically, according to one aspect, a method for capturing media content associated with at least one object is suggested, using a plurality of media capturing devices, each carried by a mobile communication device, together forming a mobile media device. The suggested method comprise controlling each of the mobile media devices according to a respective, predefined role and role specific rules for mobile media device movements, while capturing media content, following the movement of the at least one determined object, acquiring sensor data, indicative of the mobile media device movements, from the mobile media devices, and updating the roles, based on the acquired sensor data.

By applying the suggested method, a more dynamic media production will be possible, where the media producer is to a large extent assisted in his production work, due to the autonomous control of the mobile media devices, including control of the media capturing devices used for capturing media content.

According to another aspect, a computer program product comprising a computer program, stored on a computer readable medium is suggested, where the computer program product is configured to execute a method, such as the one disclosed above. According to yet another aspect, a media production system, configured to capturing media content associated with at least one object is suggested, where a plurality of media capturing devices, each carried by a mobile communication device, together form a mobile media device. The suggested media production system is configured to control each of the mobile media devices according to a respective, predefined role and role specific rules for mobile media device movements, while capturing media content, following the movement of the at least one determined object. The media production system is also configured to acquire sensor data, indicative of the media capturing device movements, from the mobile media devices, and to update the roles of the mobile media devices, based on the acquired sensor data.

According to another embodiment, a method of a mobile media device, comprising at least one media capturing device, is suggested, where the mobile media device is being controlled from a media production system, when capturing media content associated with at least one object. The suggested method comprise: receiving an indication of the at least one object for the capturing; navigating at least one media capturing device according to a respective, predefined role and role specific rules for mobile media device movements, while capturing media content, following the movement of the at least one object; capturing sensor data, indicative of the mobile media device movements, and providing the captured sensor data to the media production system; receiving from an update on each role of each of the at least one mobile media device from the media production system, and applying the respective updated role on the respective mobile media device.

According to another aspect, a computer program product comprising a computer program stored on a computer readable medium is suggested, where the computer program product is configured to execute a method according to the method disclosed above.

According to yet another embodiment, a mobile media device, controlled from a media production system, when capturing media content associated with at least one object is suggested. The mobile media device is configured to: receive an indication of the at least one object for the capturing; navigate at least one mobile media device according to a respective, predefined role and role specific rules for mobile media device movements, while capturing media content, following the movement of the at least one object; capture sensor data, indicative of the mobile media device movements, and providing the captured sensor data to the media production system; receive, from the media production system, an update on each role of each of said at least one mobile media device), and apply the respective updated role on the respective mobile media device.

BRIEF DESCRIPTION OF DRAWINGS

Different embodiments will now be described in more detail in relation to the accompanying drawings, in which.

DETAILED DESCRIPTION

Briefly described, a method is suggested where a plurality of mobile communication devices, carrying one or more devices, capable of capturing media, such as e.g. a camera, a microphone or a combination thereof, are controlled in a way which simplifies simultaneous use of these devices in a controlled way. From hereinafter, such devices, capable of capturing media are referred to as media capturing devices, while mobile communication devices comprising one or more media capturing devices are referred to as mobile media devices. When referring to controlling of a mobile media device we hereby refer to controlling of the movement of the mobile communication device, such as e.g. a UAV, in order to be able to follow the object to be captured by one or more media capturing devices, while keeping a sufficient distance to the mentioned object as well as to other objects of the environment, as well as controlling of the one or more media capturing devices, in order to optimize the performance of the capturing. Thereby the mentioned controlling is a combination of controlling of the mobility of the communication device, e.g. the UAV, and the media capabilities of the media capturing device.

More specifically, the suggested method is based on a controlled use of a plurality of roles, where, at each time instance, each mobile media device is allocated at least one dedicated role, and where each role specifies a specific task for the respective mobile media device, having specific rules for how to accomplish the respective role. These roles/tasks can be described e.g. as capturing a front view video, a side view video from the right, or an overview video, where various views can be further specified e.g. with specific distances, or distance intervals, to the objects, zoom in and zoom out requirements, and/or other parameters, relevant for the quality of the captured media. The mentioned specified parameters may be given as a specific numeric value with a given tolerance, or as numeric values, given within a specific interval. It is to be understood that in case a mobile media device is allocated more than one role, these roles need to be compatible with the movement of the mobile media device, such that e.g. one mobile media device can be allocated a role of providing a video stream of a wide view of an object of interest at the same time that it is providing a close-up view of the same point of interest, using two cameras pointing in the same direction but operating at a different focus.

The dedicated roles may be adaptively switched between available, or a limited group of, mobile media devices, in such a way that, at each occasion, the mobile media device which is considered to be most suitable for a specific role is also allocated to and controlled according to that role, where the movement, as well as the controlling of the mobile media device relates both to the movement and controlling, respectively of the mobile media device, as well as to the controlling, i.e. actuation and adaptation of the actual media capturing devices.

If applying a plurality of mobile media devices according to the method as suggested herein, the method will simplify for control, coordination and production of media content, generated e.g. by a media production system, with a maintained high quality of the produced media, which may e.g. comprise video and/or audio.

Figure 1:
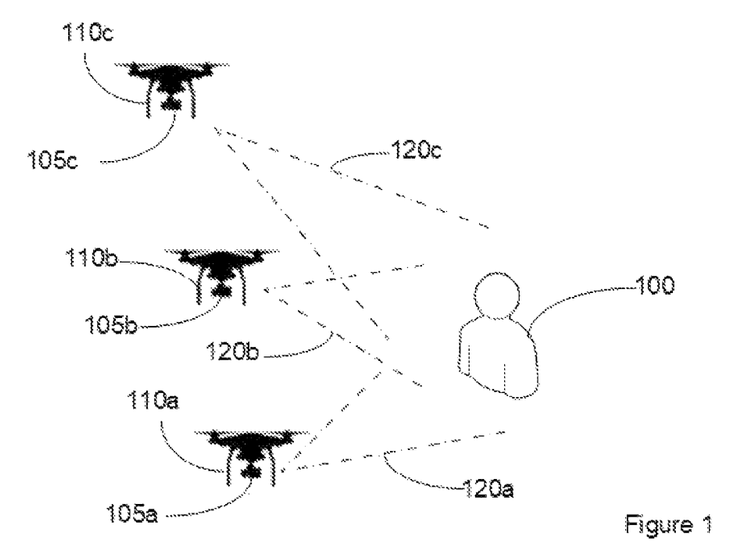
FIG. 1 is illustrating a scenario where a plurality of UAVs are capturing video of a selected object.

FIG. 1 is illustrating a typical scenario where the method as disclosed herein is applicable. An object to be captured e.g. by camera, from hereinafter referred to as an object of interest 100, being e.g. an athlete, a guide, or a vehicle, is chosen as the object which a plurality of mobile media devices, 110a, 110b, 110c, each carrying a mobile capturing device 105a,105b,105c, in the present example represented by video cameras. At sports events, there are typically a plurality of objects of interest to consider, and in such a situation, the objects of interest, which typically may change over time, may be selected as an individual object or as an object forming part of a group of individuals or vehicles, but most typically, objects of interest may be considered dynamically, such that e.g. in case of a larger group being in the lead of a race, such a group is the target for one specific role or group of roles, while a split up of such a group may instead result in a change of object/s of interest, which may also give rise to a demand for more roles, which may e.g. in turn result in activation of more mobile media devices, or a rearranging of the different roles, all in order to give the audience an enriched and diverse user experience.

As indicated in FIG. 1, each media capturing device 105a, 105b, 105c, is, when located as presented in the figure, capable of providing a video production from a different, specific view, illustrated as 120a, 120b, 120c, respectively. More specifically, media capturing device 105a is providing a view 120a from the front of the object of interest 100, media capturing device 105b is providing a side-view 120b, captured from the left of the object, while media capturing device 105c is contributing with a view 120c, which can be described as an overview, which is also here provided from the left of the object. If the three mobile media devices 110a, 110b, 110c, here constituting a respective UAV, each carrying a respective media capturing devices 105a, 105b, 105c, are allocated a respective role, where each role have the specific task of providing a respective view 120a, 120b, 120c, the different views can be used or selected alternately, in order to obtain an attractive and diverse video production. However, even if a media producer manages to set up an attractive combination of roles for a specific event, each of which is being responsible for providing a respective type of view, it is still a complex task for the media producer to maintain an adequate level of media content quality, and to be able to continuously select the most suitable media stream, while at the same time being able to control the different mobile media devices 110a, 110b, 110c, as well as the media capturing devices 105a, 105b, 105c.

The mobile media device can be controlled autonomously, semi-autonomously or manually, but typically interchangeably between the mentioned modes. By media capturing device, we refer to a device, which is typically light weighted in construction, which may include e.g. capturing of video via a camera, audio via a microphone, or, more typically, to a device capable of capturing a combination of the mentioned media types. Although the examples of mobile media devices given below refers to UAVs, providing video, the mobile media devices, as well as the captured media, therefore shall not be limited to these exemplified embodiments, but to any type of mobile device, capable of carrying any type of media capturing device or devices, for capturing any type of media content.

Typically, a communication interface of the mobile media device is applied for communicating data, including media content, captured by a media capturing device to and from the media capturing device.

The mobile media devices may be configured as a number of different types of devices, including e.g. UAVs, rail-based and wire-based devices. Typically, a video production can be performed with a combination of arrangements, where different locations and environments calls for different solutions. Alternatively, a video production, or any other type of media production, may be based on mobile media devices configured as hand held smart phones, where e.g. one or more users, following a specific object may offer, or respond to a request to provide a certain view to the production. Naturally, video streams, provided from hand held smart phones, will allow for limited controlling functionality, which may be limited e.g. to providing written or spoken instructions to the user of the respective smart phone, on when and how to move and use the smart phone for capturing.

A scenario, corresponding to any of the ones exemplified above, may include a various number of media capturing devices and roles, where the roles are typically selected based on the importance of being able to capture the one or more objects of interest from various respective angles and views, at various occasions. Weather conditions and the physical environment are examples of issues that may have a more or less important impact on which types of views that can actually be provided with sufficient quality, and, thus, also which roles that can be made available at each time instance. One general purpose with the suggested solution is to, at all time, provide the best available view of the selected view type in real time or non-real time.

Typical scenarios where a method as described herein is suitable are, as already mentioned above, sports events, but other suitable scenarios may be video capturing of a guided tour, a quality inspection tour at a construction site, an instruction or education video production, or a video production, used for assisting rescue staff during a rescue operation.

Figure 2:
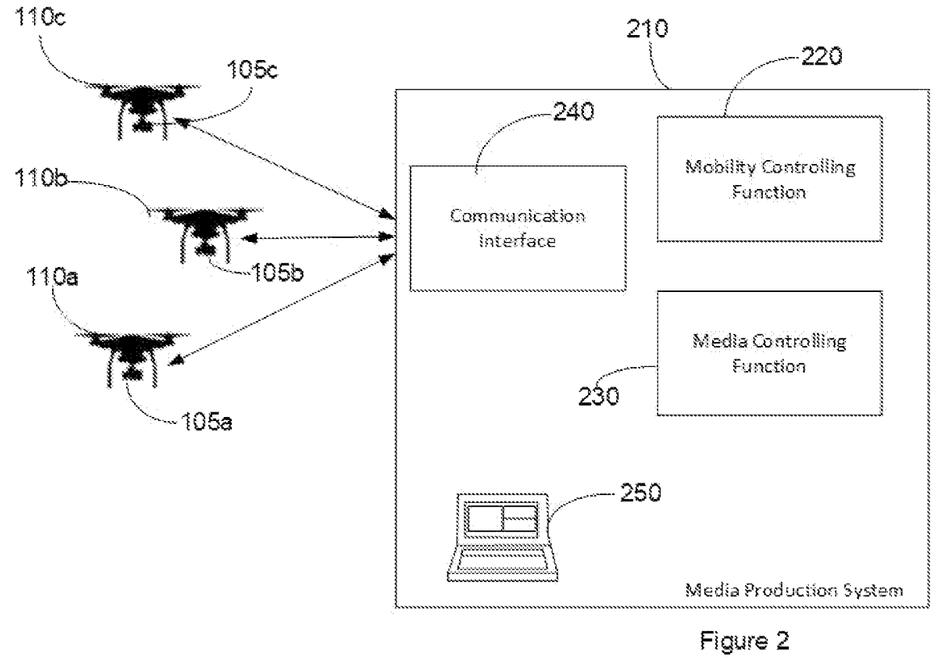
FIG. 2 is an overview of a media production system, according to one embodiment, which is capable of producing video, captured by a plurality of UAVs.

FIG. 2 is illustrating a media production system 210, capable of providing a video or any other type of media production, in a way as suggested above. The media production system 210 comprise functionality which can be divided into mutually interacting functions, here referred to as a mobility controlling function 220, for controlling the mobile media devices, a media controlling function 230, for controlling the media capturing devices, a communication interface 240, for enabling communication between the mentioned functions and the mobile media devices and media capturing devices, and a graphical user interface (GUI) 250, for enabling a producer of a media production to supervise and manually make adjustments and adaptations to the automatic media production. Although the mobility controlling function 220 and the media controlling function 230 are presented as separate functions, it is to be understood that, in order to provide a high quality media production, such as e.g. a video production, these two functions are mutually dependent of each other and, consequently, they are interacting with each other when controlling the mobile media devices, including the mobility of the mobile communication device and the one or more media capturing devices, carried by the mobile communication device. mobile media devices 110a,110b,110c, here represented by UAVs, are controlled by the mobility controlling function 220, which is configured to control the mobile media devices 110a,110b,110c via the communication interface 240, where each mobile media device 110a,110b,110c is operating according to a specific role, based on the requirements of the specific media production. As mentioned above, autonomous control of the mobile media devices 110a,110b,110c is used by default, while occasional manual control of a specific mobile media device, executed according to any known control procedure, may override the autonomous control, whenever applicable.

The mentioned roles can be maintained or switched between mobile media devices on a continuous basis, based on data available to the media controlling function 230, as described below. Furthermore, at each occasion of a video production, a ranking may be considered, so that at least video streams originating from the highest ranked media capturing devices, are provided to the end-users. Such a ranking may be dependent e.g. on capabilities of the media capturing devices 105a,105b,105c, the environment, such as e.g. weather conditions, sensed by sensors, carried by the media capturing devices and/or the mobile media devices 110a,110b,110c. Thereby, e.g. bad weather conditions experienced via sensors may result in an overview role being downgraded in ranking, if sensor output indicates that the mentioned overview role will be very difficult or impossible to fulfil, while closer views are being upgraded, so that roles providing e.g. higher quality video will be more frequently selected by the system during such conditions.

The mobility controlling function 220 is autonomously controlling the mobility of the mobile media devices 110a, 110b,110c, based on a production plan, provided by a media producer, where such a production plan typically comprises start and end time, a specification of required roles to be applied during the production, possibly including specific conditions for when to apply the respective roles and any other requirements, which may be specified in advance. One or more roles may e.g. only be relevant when capturing the finish of a race on video. The controlling is also based on conventional control signalling feedback, as well as sensor data provided from any sensor of the mobile media devices 110a,110b,110c. The sensor data may comprise data relevant for the movement of the mobile media devices 110a,110b, 110c as well as data captured by and relevant for the operation of a media capturing device 105a, 105b, 105c, which is relevant for the actual media capturing. The mentioned instructions and data is considered by role specific rules of the mobility controlling function 220, so that considerations, associated with the respective role of a mobile media device 110a,110b,110c, are at any event affected by acquired data.

A media controlling function 230 is receiving media provided from the media capturing devices 105a,105b,105c, according to active roles, via communication interface 240, or via a separate communication interface (not shown). According to one embodiment, each mobile media device 110a,110b,110c is providing media content, such as e.g. a video stream, pictures or sound, or a combination thereof, according to the best effort of the roles applicable by the respective mobile media device 110a,110b,110c.

According to a second embodiment, a video stream, in case of capturing video, is only provided to the media controlling function 230 from a respective media capturing device in case the quality of the video from that media capturing device, in this case a video camera, is above a certain quality threshold value, specified as a minimum requirement for the respective role. In case the quality is below the mentioned threshold value, the respective mobile media devices 110a,110b,110c may defer from providing any video content, and may instead e.g. provide parameters, indicative of the reason/s for not providing any video content, to the media controlling function 230. In the latter situation, in case of non-real-time distribution, video content may be stored by the mobile media devices 110a,110b,110c for later retrieval. Furthermore, received parameters may trigger a change of roles or parameters, determining the conditions for the respective roles.

The data and media content mentioned above may be provided to the mobility controlling function 220 and the media controlling function 230, respectively, via the communication interface 240 and one or more communication channels, dedicated to the respective mobile media device 110a, 110b,110c, or, in case a plurality of mobile media devices, are constituting a specific group, such as e.g. a role specific group, one of the mobile media devices of that group may have been allocated the task of collecting and forwarding data and media between the mobile media devices of the respective group and the media production system 210. The media production system 210 may also apply a combination of the mentioned ways of communication, so that certain data, such as e.g. less time critical data, is collected by one mobile media device in a group of mobile media devices, and forwarded to the media production system 210, while other, more time critical data, is provided directly from each mobile media device to the media production system 210, via a separate, or the same communication channel.

Typically, the media controlling function 230, provide a selected video view/stream for video production and distribution, or any other stream of media content, at any time occasion, where, e.g. in case of a video stream, a preferred video view is selected based on the originally provided production plan, in combination with a present ranking of the available streams, possibly overridden by a media producer, supervising available video views/streams via GUI 250.

The media production system 210 can be used e.g. for video production and distribution, wherein the video streams, provided from the media capturing devices 110a, 110b,110c at a specific time instance, are presented to a video producer on via the GUI 250, when distributed in real time, or in non-real time, where, in the latter scenario, the video streams provided from the mobile media devices 110a,110b,110c, are being prepared by the video producer for later distribution.

Although not shown in the figure, it is to be understood that the final video or other media distribution is distributed from the media controlling function 230 to end users, capable of rendering the distributed media content, via any type of known media distribution network (not shown).

According to a first scenario, applicable both in real time and in non-real-time scenarios, video or other media streams can be automatically selected by the system and presented to a media producer on the GUI 250 in a predefined manner, as prioritized streams, where the prioritization can be based on data criteria as suggested above. The way available video streams are presented to a media producer on the GUI 250 may differ depending e.g. on one or more of preferences of the media producer, type of production, conditions when capturing media content.

An automatically selected video stream may e.g. be presented as a larger size video stream, e.g. in the centre of the screen, while alternative streams are, at the same time, shown as a smaller size vide stream. Alternatively, two options may be shown at substantially similar size e.g. side by side, while remaining options are shown in smaller size. Such automation may be dependent e.g. on a combination of a production plan and one or more quality measures of the provided media content, such that, at each time instance, a stream provided by mobile media device having a preferred role, or if there are a plurality of mobile media devices having the same role, the stream for which the selected parameter/s have the highest quality. Typically, the media producer has the option to override such an automated selection at any time, thereby making use of the automated system for prioritizing video streams, both when it comes to the actual capturing of video, as well as of presenting the final result to the producer of the video production, as well as the option of taking manually decisions on top of the automated selection, whenever applicable.

According to a second scenario, which is also applicable both in real time and in non-real time, a media producer is instead presented with a number of available video streams, from which the operator manually selects which stream that is to be shown at each time instant, i.e. rather than letting the media controlling function to select a preferred video streams automatically, video streams are provided at best effort from the media controlling function 230, while the final selection of video stream is done manually, via GUI 250, throughout the production. In the latter scenario, the media controlling function 230 will still have the function of providing optimal options of streams to the media producer, while the selection phase is kept as a manual step.

A method for providing for a video production by the media production system 210 as suggested above, will now be described below, with reference to FIG. 3. In a first step 310 one or more objects of interest, from hereinafter referred to as an object or objects, is/are determined. Such an object is typically an athlete, in case the video production is a sports production, or a guide, in case the video production is referring to a guided tour, but also a football, or any other traceable object relevant for the video production may be referred to as such an object. Rules for which objects to associate to a specific role may state dynamic approaches, so that e.g. a role has its focus on a leading group of athletes in a sports competition as long as a leading group is present, while the roles may state a change to following a single object of interest in case the mentioned group splits up, possibly in combination with activating yet one or more other role/s, responsible for following what is left of the original group.

It is to be seen as a prerequisite that means for allowing the mobile media devices to track the one or more objects is provided on the mentioned objects. As already mentioned above, known mechanisms, such as e.g. follow-me functions, are known and available on the market. GPS tracking equipment may e.g. be carried by athletes, thereby allowing e.g. an athlete to be followed. Suitable equipment can also be placed in balls used in various types of sports. Further details for how to track objects have been left out, and is considered to be out of the scope, of this document.

In another step 320, roles for covering desired views are acquired, meaning that they can be determined at this stage, or already available roles may be acquired from a memory. Such acquiring, does not have to rely only on which views that are required from an operator's point of view, but may also, depending on the circumstances, including the selection of one or more backup roles, e.g. in case a specific role is considered to be of essential importance for a specific video production, and changes of environmental conditions. Rules may also be configured so that one mobile media device is associated with more than one role. The latter scenario may e.g. be suitable, when a first role is applicable only at a certain time instance or section of a race or movement pattern, such as e.g. at the start of a race, while the second role is applicable at another, non-overlapping, time instance, section or pattern, such as e.g. at the finish of a race. A specific role typically relies on a more or less detailed schedule for the video production from start to finish. Such a schedule typically comprises at least a start and a stop time, certain limitations as to the area of operation for the mobile media devices, number of and type of mobile media devices, and may also comprise specific instructions to be considered at certain specific events, geographical regions or areas, or time instances. Steps 310 and 320 both refer to the minimum preparatory steps, required for obtaining pre-requisites for a production plan for the media production.

Once the preparations, as disclosed in steps 310 and 320 have been executed, the video production procedure can start. Alternatively, test rounds can be executed initially, so that there is a start pattern available for the control mechanism at an initial phase. In case of a ski race, a test object, e.g. a traceable test skier, can e.g. be followed in the race track in order to create a reference track for the roles to be applied during the video production of the upcoming race.

According to another step 350a, the mobile media devices available for the intended video production are being controlled in an automatic and autonomous manner, with the option of taking over control manually by an operator, whenever applicable, in order to track one or more of the previously determined objects, according to the respective role of each mobile media device. The controlling is based on the production plan in combination with the role specific rules, and control signalling feedback provided from the mobile media devices, and possibly also input from the initial reference track. Such rules typically include anti-collision functionality, which is holding a first priority, in order to avoid collisions between the mobile media devices. Similar functionality or algorithms may also be applied for avoiding that different mobile media devices are moving within view of another mobile media device, whenever this is possible to avoid. As already mentioned, there are a number of commonly known anti-collision systems available on the market, and therefore, further details on such a functionality have deliberately been left out of this document. Media capturing devices are being controlled in parallel to the controlling of the mobile media devices, as indicated with step 350b. Here, controlling is based on the production plan, in combination with role specific rules and control signalling feedback provided from the media capturing devices.

The mentioned rules also depend on, and respond to, sensor data, captured by sensors of the mobile media devices and provided to the media production system, as indicated with step 340. In addition to sensor data, indicative of the movement of the mobile media device, typically including geographical position, position relative other to other mobile media devices and speed of the mobile media devices, sensor data also include data indicative of the quality and/or performance of the video capturing. Such data may e.g. include one or more of a position of a mobile media device with respect to an object, a zoom level with respect to an object, a motion blur with respect to an object, a depth of field with respect to an object and an image quality with respect to an object, or any other parameter, indicating a measure with respect to a tracked object. Typically, the mentioned rules are applying certain priorities, where movement, based on anti-collision considerations, overrules quality issues, in situations when both considerations cannot be fully followed. Although step 330 is illustrated as being executed subsequent to step 340, it is to be understood that these two steps can executed in another order, or in parallel.

The roles, initially set in step 320, are continuously updated, as indicated with another step 360. Also this step can be done in a different order, in relation to the other mentioned steps, as long as the updating is executed subsequent to step 320 and on a continuous basis. The mentioned rules are initially configured to control the mobile media devices according to default patterns, in order to fulfill certain predefined tasks, such as e.g. to provide an overview of a leader or leading group, e.g. by maintaining a more or less constant distance between a camera and the object, but in order to continuously optimize the different roles, roles may be re-defined or even switched between mobile media devices, whenever it is determined by functionality of the media production system that a more optimized selection of roles should be obtained. By way of example, mobile media devices operating on stand-by may take over a certain role from another mobile media device, and a plurality of mobile media devices may therefore operate in a group, having the same roles, but operating by complementing and covering up for each other, thereby assuring that a specific view, provide by a specific role can be presented at all time throughout at least a part of a video production. As already mentioned above, media capturing devices operating in group may communicate with the media production system via one dedicated mobile media device with respect to all or some data, provided to the media production system.

As indicated with another step 370, the mentioned method steps from step 330 and onwards are repeated until the scheduled end of production is reached.

Figure 4:
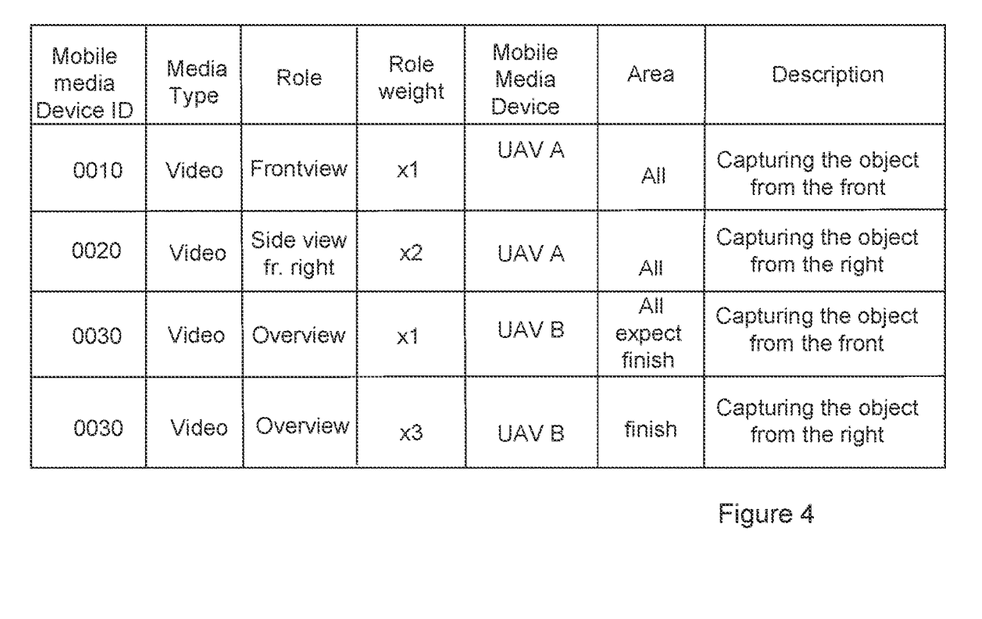
FIG. 4 is a table, exemplifying how different roles and their associated data can be defined and monitored.

FIG. 4 is a simplified exemplification of a listing of mobile media devices, each specified with identities from 0010 to 0030, respectively, and each of which constituting a respective mobile media device type, here indicated as UAV A or UAV B, respectively. While the presented list is showing some basic data, it is to be understood that a listing for the different roles, and associated data, will typically be more detailed, such that it also typically comprise e.g. a number of conditional, alternative rules, as well as various parameter intervals, indicating how to control a respective mobile media device, i.e. a UAV and a respective media capturing device, such as e.g. a camera, associated with the respective role. Each role may also have a certain weight allocated to it, where such role weights may have been set by default, depending on the composition of roles, allocated for a certain video production, but where such weights may be dynamically adaptable, based e.g. on sensor output, indicating how well a respective role is expected to be fulfilled. Type of camera, here video camera, and area in which a mobile media device is to be active are also indicated in the presented list. The rules applied by the mobile media devices may result in that the mentioned list is updated on a dynamic basis, typically by changing or switching roles between mobile media devices.

Figure 5:
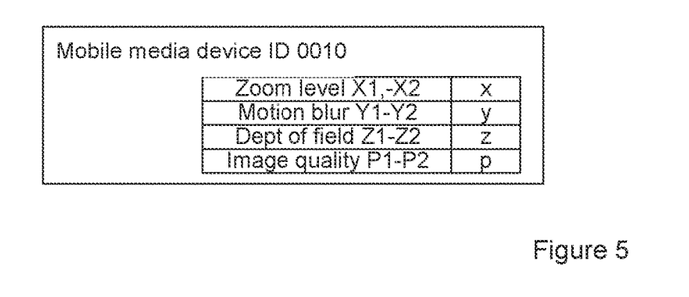
FIG. 5 is another table, exemplifying parameters decisive of a specific role.

FIG. 5 is an exemplification of a table of sensor data, and associated parameter ranges applicable for a specific role, here allocated to mobile media device 0010, having a role, referred to as Front view, where the left column indicates ranges of various parameters, allocated for the applicable role of mobile media device 0010, whereas the right column is showing the actual parameter values, monitored by the mobile media device. When comparing the acquired parameters with the pre-defined parameter intervals of the role, it will be possible to determine how well mobile media device 0010 is suited to continue in the Front view role. By continuously comparing how well each mobile media device is matching with the requirements for the respective role, an optimization algorithm, applied when updating roles, assures that roles are being maintained or switched accordingly . . . . Although the sensor data of FIG. 5 are only associated with camera settings, it is to be understood that the presented table may also comprise corresponding definitions of settings applicable for the movement of the respective mobile media device. In case the mobile media device comprise a plurality of media capturing devices, the table of that mobile media device may comprise separate settings for each mobile media device.

A media production system, capable of executing a method according to any of the embodiments mentioned above is suggested. More specifically, a media production system configured to capture at least one object on video, using a plurality of media capturing devices, each carried by a mobile communication device, together forming a mobile media device, is presented. The media production system is configured to control each of the mobile media devices according to a respective, predefined role and role specific rules for mobile media device movements, while capturing video, following the movement of the at least one determined object of interest; acquire sensor data, indicative of the mobile media device movements, and update the roles of the mobile media devices, based on the acquired sensor data.

The media production system is typically configured to repeat the procedure suggested above until no more video capturing is required.

The mentioned system is configured to consider various types of sensor data, including data indicative of the quality of the video capturing.

In order to be able to give different weight to different types of sensor data, the media production system is configured to apply role specific weights to at least part of the acquired sensor data, based on the movement of the mobile media devices and other acquired sensor data.

The media production system is configured to process different types of sensor data, including data indicating any of: the position of the mobile media device with respect to one of the at least one objects of interest; zoom level with respect to one of said at least one objects; data indicating motion blur with respect to one of said at least one objects; depth of field with respect to one of said at least one objects, and image quality with respect to one of said at least one objects.

The media production system may, according to one embodiment, be configured to determine that a required set of roles cannot be fulfilled by the available mobile media devices, and, as a consequence, update the roles for the relevant mobile media devices by adding or replacing at least one mobile media device to the present set of video capturing mobile media devices.

According to another embodiment, the media production system is configured to prioritize at least one video stream, based on a weighted role of the mobile media device with which the respective video stream has been captured, and present the video streams on a GUI according to the prioritization.

According to yet another embodiment, the media production system is configured to receive instructions for manually controlling at least one of the prioritized video streams, via the GUI, where such instructions are typically provided from an operator, preferring a selection of the video stream to be provided to the end users which differs from the automatically provided one.

Figure 6:
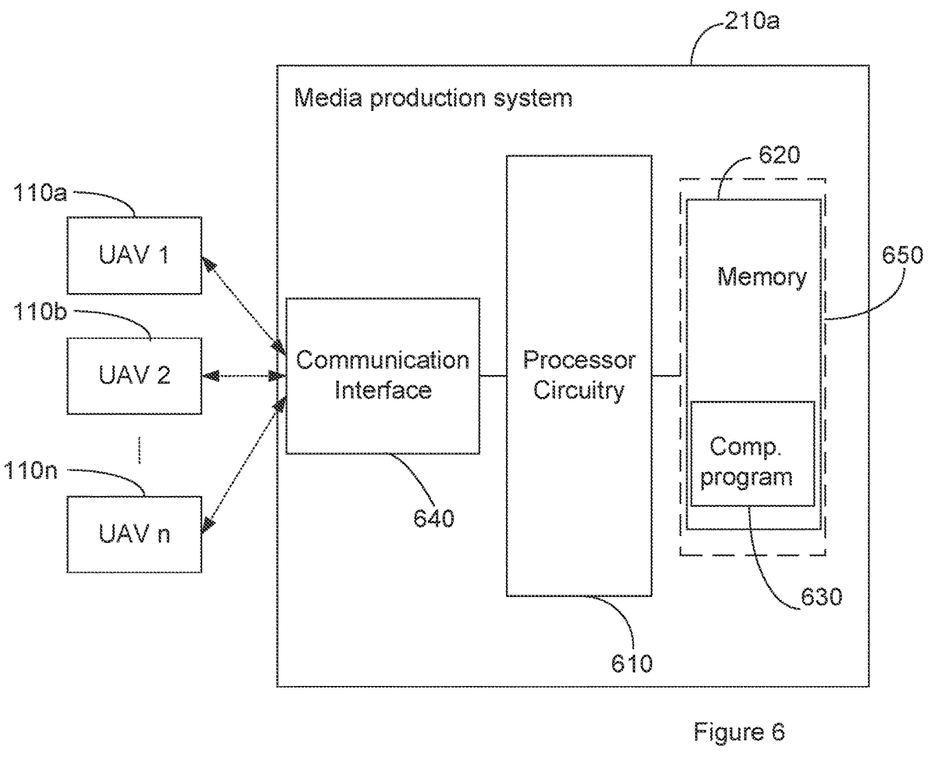
FIG. 6 is a block scheme, illustrating a media production system, according to a first embodiment.

FIG. 6 is a block scheme, illustrating a media production system 210*a*, which is configured as suggested above, according to a first embodiment. The media production system 210*a*, comprises a processor circuitry 610, comprising any combination of one or more of a suitable central processing unit (CPU), multiprocessor, microcontroller, digital signal processor (DSP), application specific integrated circuit etc., capable of executing software instructions, stored in a memory 620, so that a method according to any of the embodiments described above can be executed. The memory 620 may be any combination of read and write memory (RAM) and read only memory (ROM). The memory also comprises persistent storage, which, for example, can be any single one or combination of magnetic memory, optical memory, solid state memory or even remotely mounted memory. The media production system 210*a* also comprise a communication interface 640 configured to enable the processor circuitry 610 to communicate with the mobile media devices, here represented by UAV 1, 110*a*, UAV 2, 110*b* and UAV n, 110*n*. As indicated in FIG. 6, executable software instructions are provided as a computer program 630, where the program 630 may form part of a computer program product 650. The computer program product 650 may be e.g. an optical disc, such as a CD (compact disc) or a DVD (digital versatile disc) or a Blu-Ray disc. Alternatively, the computer program product 650 may be embodied in a memory of the media production system 210*a*, or as a removable solid state memory, e.g. a flash storage memory (such as a Universal Serial Bus (USB) drive).

More specifically a media production system, as described above, is configured to capture one or more specific and selected objects on video using a plurality of media capturing devices, each carried by a respective mobile communication device, together forming a mobile media device. In order to be able to provide a diverse production, the media production system is configured to control each of the mobile media devices according to a respective, predefined role and role specific rules for media capturing device movements, while capturing video, following the movement of the one or more determined object. The video production system is also configured to acquire sensor data, indicative of the media capturing device movements, from the mobile media devices, and to update the roles of the mobile media devices, based on the acquired sensor data.

The suggested media production system is, according to on embodiment, configured to repeatedly control the mentioned media capturing devices and to continuously update the mentioned roles until no more video capturing is required, typically according to a predetermined production plan.

The media production system is, according to on embodiment, configured to process sensor data indicative of various measures, such as e.g. the quality of the video capturing, and/or weather conditions.

The media production system is also, according to on embodiment, configured to apply role specific rules, applying role specific weighting of at least part of the sensor data, indicative of e.g. the movement of the mobile media devices, thereby prioritizing certain movement related considerations over other considerations during controlling.

According to one embodiment, the media production system is configured to update the roles by determining that, under the present circumstances, a required set of roles cannot be fulfilled by the available mobile media devices, and therefore the roles for said mobile media devices are being updated by adding at least one mobile media device, e.g. so that more roles can be applied, or by replacing at least one mobile media device, e.g. so that a replacing mobile media device, and its one or more media capturing devices, are better suited that the replaced ones to fulfill the requirements for one or more acquired roles.

In order to provide enhanced automation in the system, the media production system is configured to prioritize at least one video stream based on a weighted role of the mobile media device with which the respective video stream has been captured, i.e. a role which is considered to provide a preferred video stream, and to present the one available video streams on a Graphic User Interface, GUI, according to the prioritization. The prioritized stream may e.g. be presented as a bigger picture and/or presented in an ergonomically advantageous way on a display.

According to one embodiment, the media production system is configured to receive instructions via the GUI, for manually controlling at least one of the prioritized video stream, i.e. instructions forcing the system to overrun the automatic controlling of the video streams.

Figure 7:
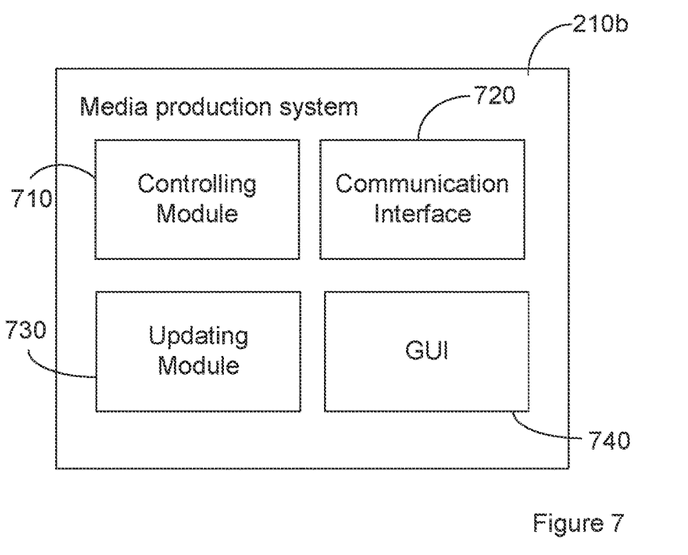
FIG. 7 is a block scheme, illustrating a media production system, according to a second embodiment.

A media production system 210*b* according to another embodiment is described with reference to FIG. 7, where functionality of the media production system is described as units or modules, which are configured to interact with each other, so that a method according to any of the embodiments described above is executable.

Figure 3:
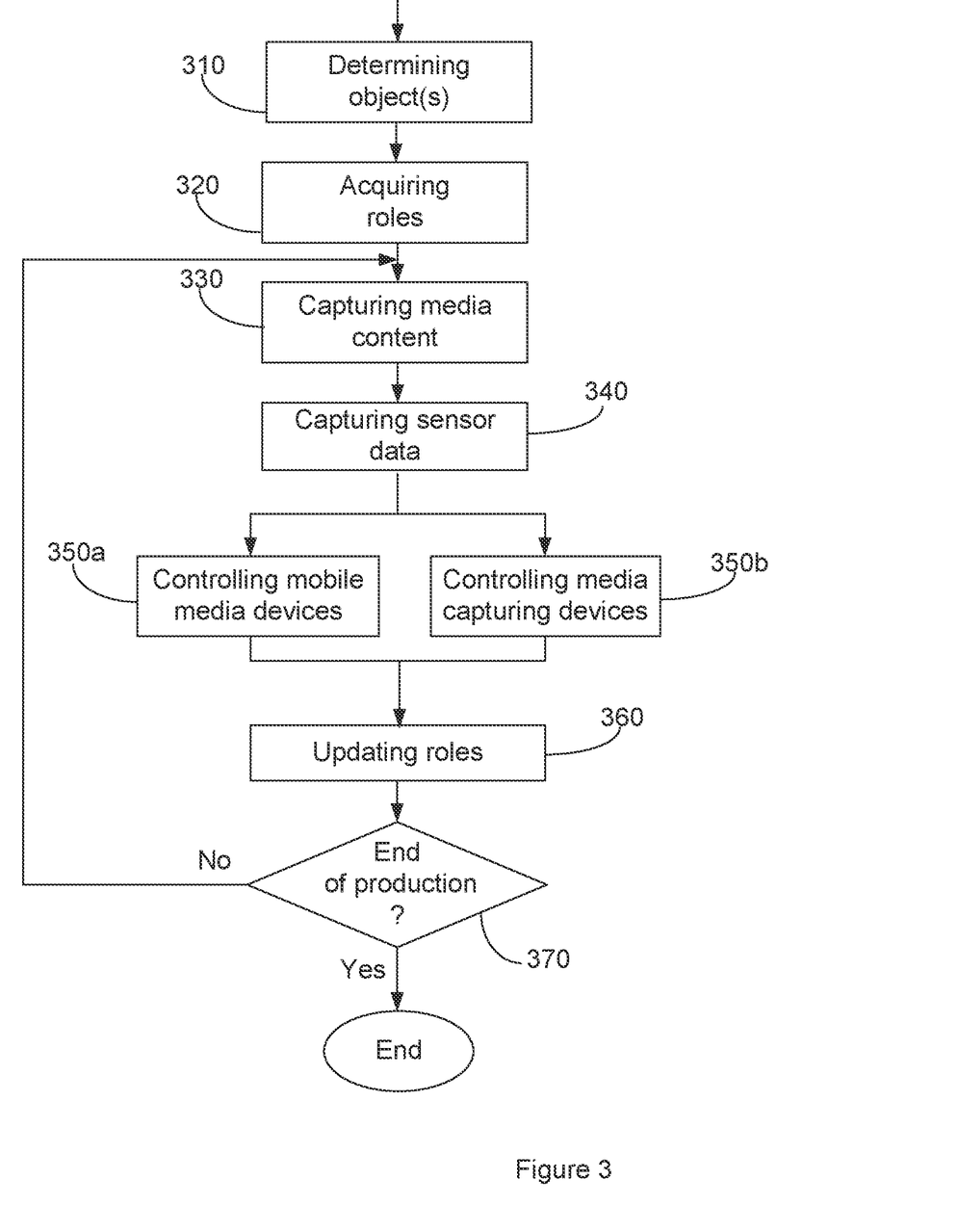
FIG. 3 is a flow chart, illustrating a method, executable in a media production system, according to one embodiment.

The media production system 201*b* comprises a controlling module 710, capable of controlling one or more mobile media devices, according to a predefined role and rule specific rules, corresponding to step 350*b* of FIG. 3, as well as the mobile media device, as such, corresponding to step 350*a*, wherein the controlling is executed via a communication interface 720. Consequently, the suggested controlling module 710 is capable of providing mobility controlling functionality as well as media controlling functionality. The communication interface 720 is also configured to acquire sensor data, indicative of media capturing device movements, from the mobile media devices, during the mentioned controlling. An updating module 730, is configured to update roles of the mobile media devices, based on acquired sensor data, corresponding to step 360 of FIG. 3. The media production system 210*b* also comprise a GUI 740, configured to present video streams to an operator, and to allow manual operation and selection of video streams.

A method, executable in a mobile media device, capable of providing video content to a media production system as disclosed above, will now be described with reference to FIG. 8. As already indicated above the mobile media device is a mobile communication device, such as e.g. a UAV, comprising one or more media capturing devices, such as e.g. a lightweight video camera, where the mobile communication device, as well as the media capturing device can be autonomously controlled by the media production system.

In a first step 810, roles are acquired for each mobile media device, and once this has been done, the mobile media device, as well as all other mobile media devices for which at least one mobile media device has been appointed a role, will be able to start navigating along the path of one or more objects of interest. Consequently, the one or more media capturing devices, and thus also the mobile media device carrying the mentioned one or more media capturing devices, are being navigated by signalling received from the media production system, as indicated with step 820. Sensor data is being captured from media capturing devices, as well as from the mobile communication device, as indicated in another step 830, and, as indicated in step 840, captured sensor data is provided to the media production system. The mentioned steps 820-840 are repeated for the duration of the video production, according to the applicable production plan, and, consequently, it is determined, based on signalling provided from the media production system, whether the production has come to an end or not, as indicated with step 850. As long as the production is to continue, the mobile media device will receive updated roles for all active media capturing devices, as indicated in step 860, and the received roles will be applied by the mobile media device, as indicated in step 870.

Figure 9:
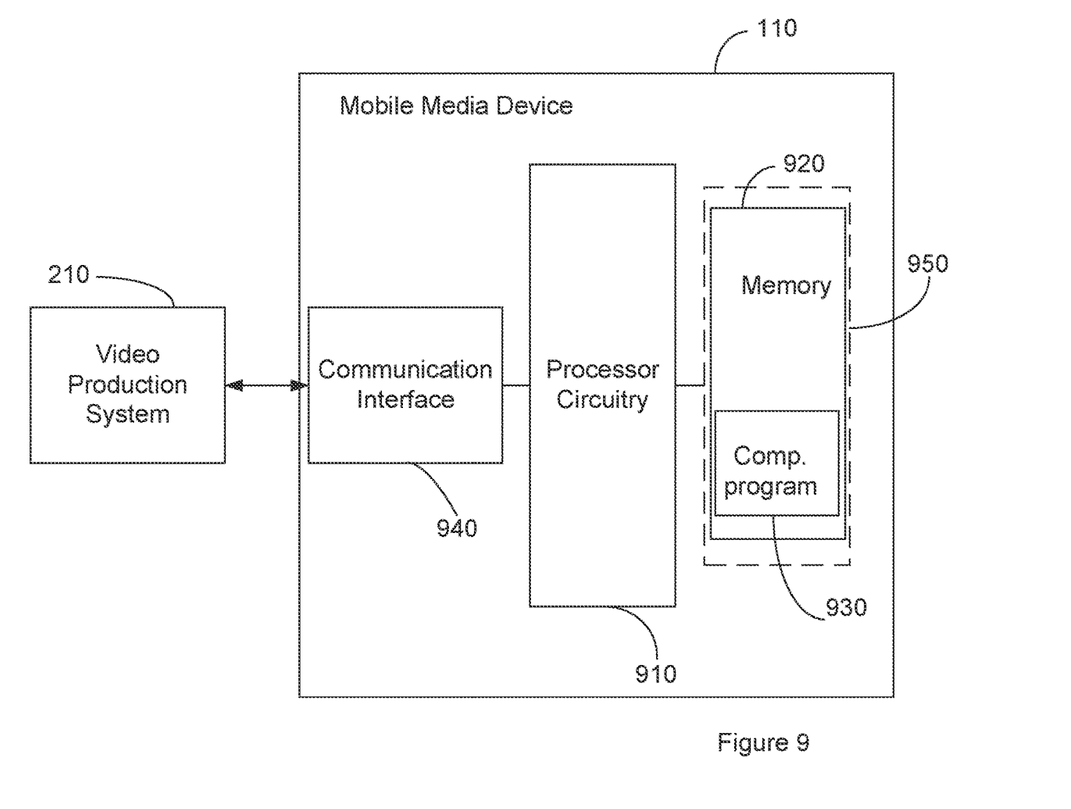
FIG. 9 is a block scheme, illustrating a mobile media device according to a first embodiment.

A mobile media device, capable of executing the method as described above, according to a first embodiment, will now be described below, with reference to FIG. 9.

The mobile media device 110, comprises a processor circuitry 910, comprising any combination of one or more of a suitable central processing unit (CPU), multiprocessor, microcontroller, digital signal processor (DSP), application specific integrated circuit etc., capable of executing software instructions, stored in a memory 920, so that a method according to any of the embodiments described above can be executed. The memory 920 may be any combination of read and write memory (RAM) and read only memory (ROM). The memory also comprises persistent storage, which, for example, can be any single one or combination of magnetic memory, optical memory, solid state memory or even remotely mounted memory. The mobile media device 110 also comprise a communication interface 940 configured to enable the processor circuitry 910 to communicate with a video production system, such as the one described above. As indicated in FIG. 9, executable software instructions are provided as a computer program 930, where the program 930 may form part of a computer program product 950. The computer program product 950 may be e.g. an optical disc, such as a CD (compact disc) or a DVD (digital versatile disc) or a Blu-Ray disc. Alternatively, the computer program product 950 may be embodied in a memory of the mobile media device 110, or as a removable solid state memory, e.g. a flash storage memory (such as a Universal Serial Bus (USB) drive).

More specifically, the mobile media device 110, being controlled from a media production system, when capturing at least one object on video is configured to receive an indication of the at least one object for the capturing and navigate at least one mobile media device according to a respective, predefined role and role specific rules for media capturing device movements, while capturing video, following the movement of the at least one selected object. The mobile media device 110 is also configured to capture sensor data, indicative of the mobile media device movements, to providing the captured sensor data to the media production system, to receive an update on each role of each of said at least one mobile media device from the media production system and to apply the respective updated role on the respective mobile media device.

According to one embodiment, the mobile media device is configured to communicate directly with the media production system, whereas in an alternative embodiment, it is instead configured to communicate with the media production system via another of the at least one mobile media device, operating as a coordinator for a group of mobile media devices. The two embodiments mentioned above may also be combined, so that some sensor data and or control data, such as e.g. more time critical data, is communicated directly, while other data is provided via another mobile media device.

According to one embodiment, the mobile media device is configured to process at least part of the sensor data before it is provided to the media production system. Such processing may comprise e.g. one or more of aggregating data provided from a plurality of media capturing devices, averaging data provided from a plurality of media capturing devices, or ranking data provided from a plurality of media capturing devices.

According to one embodiment, the mobile media device is configured to execute at least parts of the processing based on signaling provided from another of said media capturing devices. Such delegated processing may e.g. be due to that one mobile media device, acting as a relay station and/or coordinator, has network access, while remaining mobile media devices use D2D of WiFi for its respective data communication.

Figure 10:
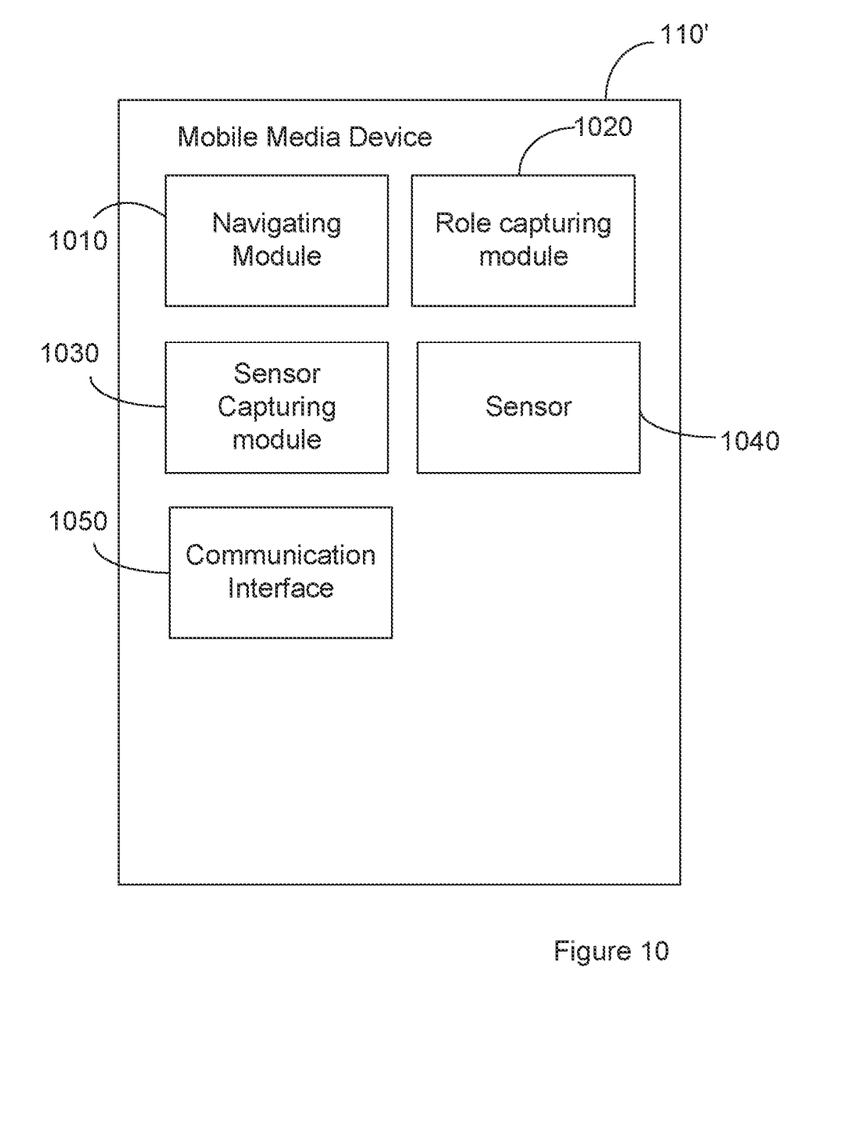
FIG. 10 is a block scheme, a mobile media device according to a second embodiment.

A mobile media device, capable of executing the method as described above, according to a second embodiment, comprising a plurality of interacting modules or units, will now be described below, with reference to FIG. 10.

Figure 8:
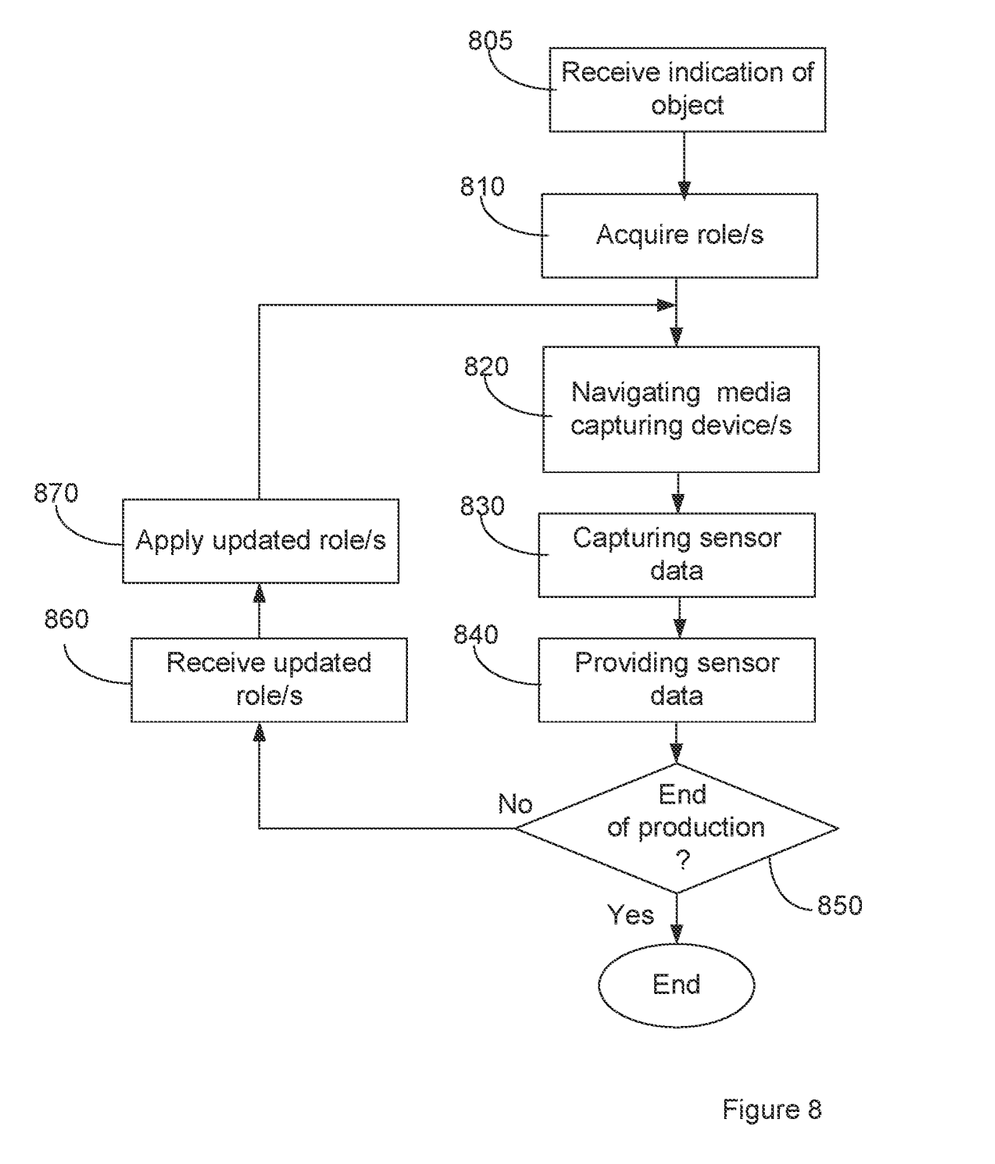
FIG. 8 is a flow chart, illustrating a method, executable in a mobile media device, according to one embodiment.

A navigating module 1010 is configured to navigate one or more mobile media device which has been appointed a respective role by a role capturing module 1020, corresponding to step 820 and 810, respectively, of FIG. 8. A sensor capturing device 1030 is configured to capture sensor data from sensors, here represented by one sensor 1040, corresponding to step 830 of FIG. 8, which is provided to the media production system via a communication interface 1050, corresponding to step 840 of FIG. 8. here represented by communication interface 1050. The role capturing module 1020 is also configured to apply updated roles, corresponding to step 870 of FIG. 3, that have been received by the communication interface 1050, corresponding to step 860 of FIG. 8.

The invention claimed is:

1. A method for capturing media content associated with at least one object, using a plurality of media capturing devices, each carried by a mobile communication device, together forming a mobile media device, the method comprising:
   controlling each of the mobile media devices according to a respective, predefined role and role specific rules for mobile media device movements, while capturing media content, following the movement of the at least one object, wherein each mobile media device is allocated with the respective, predefined role, which specifies a specific task having the role specific rule for how to accomplish the respective, predefined role, and is allocated with a weight;
   acquiring sensor data, indicative of the mobile media device movements and indicative of a quality of the captured media content, from the mobile media devices, and further indicative of at least one of zoom level, motion blur and depth of field with respect to the at least one object;
   updating the roles of the mobile media devices, based on the acquired sensor data;
   repeating steps of controlling the mobile media devices, acquiring the sensor data, and updating the roles of the mobile media devices, until no more media content capturing is required; and
   prioritizing at least one media stream based on the weighted role of the mobile media device.

2. The method according to claim 1, wherein the role specific rules are applying role specific weighting of at least part of the sensor data, indicative of the movement of the mobile media devices.

3. The method according to claim 1, wherein the sensor data is further indicative of:
   position of mobile media device with respect to the at least one object; and
   image quality with respect to the at least one object.

4. The method according to claim 1, wherein the updating of roles comprising the further steps of:
- determining that a required set of roles cannot be fulfilled by the available mobile media devices, and
- updating the roles for said mobile media devices by adding at least one mobile media device to the present set of media content capturing mobile media devices.

5. The method according to claim 1, wherein at least one of the mobile media devices is an Unmanned Aerial Vehicle, UAV.

6. The method according to claim 1, comprising the further steps of:
- prioritizing the at least one media stream based on the weighted role of the mobile media device with which the respective media content has been captured, and
- presenting the media streams on a Graphic User Interface, GUI, according to the prioritization.

7. The method according to claim 6, comprising the further step of:
- receiving, via the GUI, instructions for manually controlling at least one of said prioritized media streams.

8. A media production system, configured to capturing media content associated with at least one object, using a plurality of media capturing devices, each carried by a mobile communication device, together forming a mobile media device, the media production system being configured to perform operations comprising:
- controlling each of the mobile media devices according to a respective, predefined role and role specific rules for mobile media device movements, while capturing media content, following the movement of the at least one object, wherein each mobile media device is allocated with the respective, predefined role, which specifies a specific task having the role specific rule for how to accomplish the respective, predefined role, and is allocated with a weight;
- acquiring sensor data, indicative of the media capturing device movements and indicative of a quality of the captured media content, from the mobile media devices, and further indicative of at least one of zoom level, motion blur and depth of field with respect to the at least one object;
- updating the roles of the mobile media devices, based on the acquired sensor data;
- repeating steps of controlling the mobile media devices, acquiring the sensor data, and updating the roles of the mobile media devices, until no more media content capturing is required; and
- prioritizing at least one media stream based on the weighted role of the mobile media device.

9. The media production system according to claim 8, further configured to apply role specific rules, applying role specific weighting of at least part of the sensor data, indicative of the movement of the mobile media devices and other acquired sensor data.

10. The media production system according to claim 8, configured to update the roles by determining that a required set of roles cannot be fulfilled by the available mobile media devices, and updating the roles for said mobile media devices by adding at least one mobile media device to the present set of media content capturing mobile media devices.

11. The media production system according to claim 8, further configured to prioritize the at least one media stream based on the weighted role of the mobile media device with which the respective media content has been captured and present the media streams on a Graphic User Interface, GUI, according to the prioritization.

12. The media production system according to claim 11, further configured to receive, via the GUI, instructions for manually controlling at least one of said prioritized media streams.

13. A method of controlling a mobile media device, comprising at least one media capturing device, the mobile media device being controlled from a media production system, when capturing media content associated with at least one object, the method comprising:
- receiving an indication of the at least one object for the capturing;
- navigating at least one media capturing device according to a respective, predefined role and role specific rules for mobile media device movements, while capturing media content, following the movement of the at least one object, wherein each mobile media device is allocated with the respective, predefined role, which specifies a specific task having the role specific rule for how to accomplish the respective, predefined role, and is allocated with a weight;
- capturing sensor data, indicative of the mobile media device movements and indicative of a quality of the captured media content, and providing the captured sensor data to the media production system, and further indicative of at least one of zoom level, motion blur and depth of field with respect to the at least one object;
- receiving, from the media production system, an update on each role of each of said at least one mobile media device based on the acquired sensor data;
- applying the respective updated role on the respective mobile media device;
- repeating steps of receiving the indication, navigating the at least one media capturing device, capturing the sensor data, receiving the update, and applying the respective updated role, until no more media content capturing is required; and
- prioritize prioritizing at least one media stream based on the weighted role of the mobile media device.

14. The method according to claim 13, wherein the mobile media device is communicating directly with the media production system.

15. The method according to claim 13, wherein the mobile media device is communicating with the media production system via another of said at least one mobile media device.

16. The method according to claim 13, wherein at least part of the sensor data is being processed by the mobile media device before it is provided to the media production system.

17. The method according to claim 16, wherein the processing comprises at least one of:
- aggregating data provided from a plurality of mobile media devices,
- averaging data provided from a plurality of mobile media devices, and
- ranking data provided from a plurality of mobile media devices.

18. The method according to claim 13, wherein the navigation is executed at least partly based on signaling provided from another of said mobile media devices.

19. The method according to claim 18, wherein said plurality of mobile media devices are forming a pair or group of mobile media devices, wherein the mobile media devices of said group are allocated the same role.

20. A mobile media device, comprising at least one media capturing device, the mobile media device being controlled from a media production system, when capturing media content associated with at least one object, the mobile media device being configured to perform operations comprising:
- receiving an indication of the at least one object for the capturing;
- navigating at least one mobile media device according to a respective, predefined role and role specific rules for mobile media device movements, while capturing media content, following the movement of the at least one object, wherein each mobile media device is allocated with the respective, predefined role, which specifies a specific task having the role specific rule for how to accomplish the respective, predefined role, and is allocated with a weight;
- capturing sensor data, indicative of the mobile media device movements and indicative of a quality of the captured media content, and providing the captured sensor data to the media production system, and further indicative of at least one of zoom level, motion blur and depth of field with respect to the at least one object;
- receiving, from the media production system, an update on each role of each of said at least one mobile media device based on the acquired sensor data;
- applying the respective updated role on the respective mobile media device;
- repeating steps of receiving the indication, navigating the at least one mobile media device, capturing the sensor data, receiving the update, and applying the respective updated role, until no more media content capturing is required; and
- prioritizing at least one media stream based on the weighted role of the mobile media device.

21. The mobile media device according to claim 20, wherein the mobile media device is configured to communicate directly with the media production system.

22. The mobile media device according to claim 20, wherein the mobile media device is configured to communicate with the media production system via another of said at least one mobile media device .

23. The mobile media device according to claim 20, configured to process at least part of the sensor data before it is provided to the media production system.

24. The mobile media device according to claim 23, wherein the processing comprises at least one of:
- aggregating data provided from a plurality of mobile media devices,
- averaging data provided from a plurality of mobile media devices, and
- ranking data provided from a plurality of mobile media devices.

25. The mobile media device according to claim 20, configured to execute at least parts of the processing based on signaling provided from another of said mobile media devices.

* * * * *